United States Patent [19]

White

[11] 3,981,226
[45] Sept. 21, 1976

[54] ROTATABLE BASE UNIT FOR A ROUTER FOR TRIMMING LAMINATE PLASTICS

[76] Inventor: Kenneth N. White, 12650 90th Ave., Palos Park, Ill. 60464

[22] Filed: Sept. 27, 1974

[21] Appl. No.: 510,116

[52] U.S. Cl. .................................. 90/12 D; 33/42; 144/134 D; 144/136 C
[51] Int. Cl.² .......................................... B23C 1/20
[58] Field of Search ................ 33/32 R, 41 E, 41 F, 33/41 R, 41 L, 42; 144/134 A, 134 D, 136 C, 253 J, 253 D; 90/12 D

[56] References Cited
UNITED STATES PATENTS

| | | | |
|---|---|---|---|
| 2,613,704 | 10/1952 | Sacrey | 144/134 D X |
| 2,705,032 | 3/1955 | Pearson | 144/136 C X |
| 2,717,013 | 9/1955 | Zwalenburg | 144/136 C X |
| 2,756,785 | 7/1956 | Godfrey | 144/134 D |
| 2,823,713 | 2/1958 | Goldsmith | 144/136 C |

Primary Examiner—Al Lawrence Smith
Assistant Examiner—Gary L. Smith
Attorney, Agent, or Firm—Alter and Weiss

[57] ABSTRACT

A router for trimming laminate plastic having a unique method of adjusting the blade position. The blade is adjusted by a template unit rotatingly attached to the router housing undersurface thereby positioning the blade for proper trimming. Through movement of the router along an adjoining perpendicular surface, while utilizing the template unit to direct the trimming direction the laminate plastic material held in the router clearance space is trimmed.

3 Claims, 5 Drawing Figures

ROTATABLE BASE UNIT FOR A ROUTER FOR TRIMMING LAMINATE PLASTICS

This application relates to an invention associated with routing tools and is copending with application Ser. No. 510,013 having the same inventor and filing date as this application and relating to another invention associated with similar routing tools.

This invention relates generally to routers for trimming laminate plastic material and more particularly to a router having a rotatable base unit and template guide means for trimming laminate plastics.

Routers are in wide use in industry today. The cutting part or blade is usually attached to the drive mechanism with the motor unit enclosed in a housing. The blade protrudes below the housing undersurface and is adjusted for trimming by thumb screws or locking nuts. This type router is disclosed in U.S. Pat. No. 2,562,143.

Most routers available today require that a material to be trimmed must be marked before trimming. The routers further require placing of the laminate plastic material to be trimmed in an exact location relative the blade. In some instances, a minute trim must be made, or scraps of material must be trimmed off by the trimmer to enable the trimming blade to approach the exact location of the trim. Additionally, as conventionally performed, the person trimming must constantly keep a sharp vigil on an indicated line or the trim line will be incorrect, and may cause a costly error.

Accordingly, an object of this invention is to provide a router for trimming laminate plastics with an improved method for adjusting the blade position of the router.

Another object is to provide a router for trimming laminate plastics which does not require the material be marked before use but rather uses an integrated template unit for pre-determination and guidance through the trimming configuration.

Another object is to provide a method so that the errors in trimming laminate plastic material are reduced, whereby a test on the material or scraps is not required.

A further object is to provide a router for trimming laminate plastics wherein adjustment of the housing base by rotation provides accurate trimming of the laminate plastic material.

In keeping with an aspect of this invention, this and other objects are accomplished by providing a router for trimming laminate plastics with a housing having a rotatable template, attached to the router's housing undersurface. The drive unit and cutting member are disposed together in the housing unit and the proper level of the drive unit and cutting member combination can be independently adjusted. A rotatable template unit comprising a circular template base plate with an attached template follower allows the user to vary the position of the blade relative to the material to be cut while utilizing the template guide means.

A preferred embodiment of the invention may be best understood from a study of the attached drawings wherein.

Figure 1:
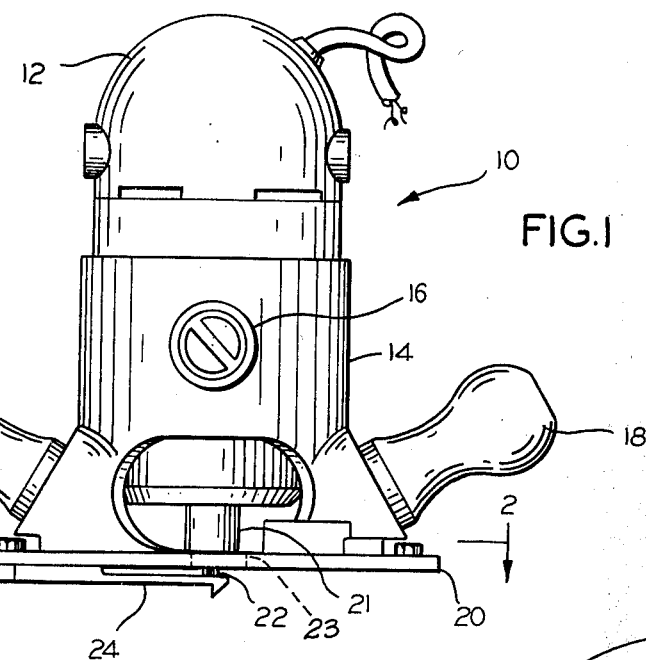
FIG. 1 is a side elevational view of a router for trimming laminate plastics embodying the present invention.

Similar reference characters indicate corresponding features throughout the several views. In FIG. 1 the numeral 10 identifies a router for trimming laminate plastics comprising a drive unit 12 enclosed in a housing 14.

Figure 3:
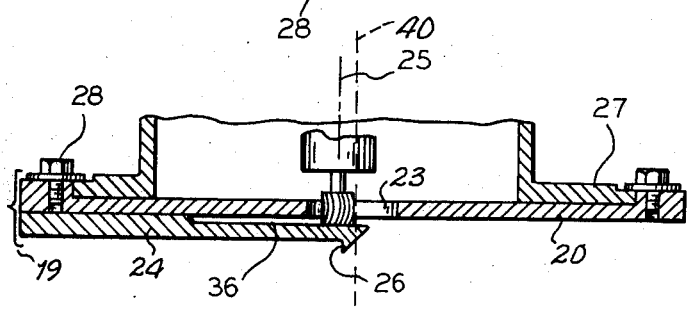
FIG. 3 is a cross sectional view of the template guide unit and router housing taken along lines 3—3 and looking in the direction of the arrows, showing in detail the template unit attached to the housing undersurface.

The housing 14 has in its side a locking device 16 for adjusting the height of the drive unit 12 and the blade 22. The drive unit 12 is adapted to rotatably drive blade 22 along a first axis 25 perpendicular to the housing undersurface 27. The housing 14 also includes two handles 18 and 18' held during movement of the unit. The blade 22 is held in place by a collet nut 21 which is centrally and vertically disposed within the drive unit 12. As seen in FIGS. 1 and 3, the blade 22 projects below the housing undersurface 27. Additionally, evacuated core 23 in template base 20 is also shown in both FIGS. 1 and 3.

Figure 2:
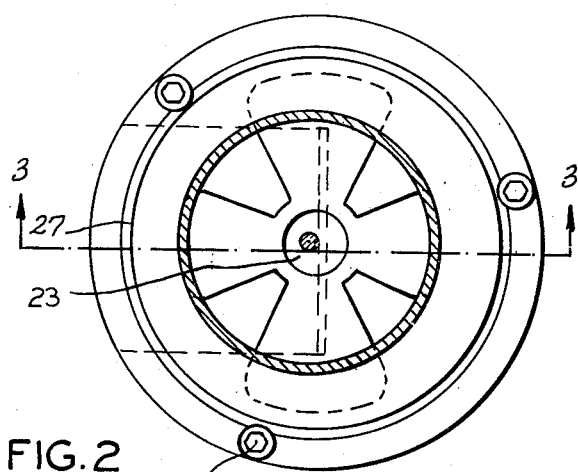
FIG. 2 is a cross-section taken along the line 2—2 of FIG. 1, and looking in the direction of the arrows.

In FIG. 2, a cross-sectional view taken through 2—2 of FIG. 1, the blade 22 is seen used in operation. The blade 22 protrudes through the housing undersurface 27 and the attached template base 20, through a midline evacuated core 23 in the template base 20. For manual operation, the blade 22 is located in an eccentric position relative to the circular core 23.

Figure 5:
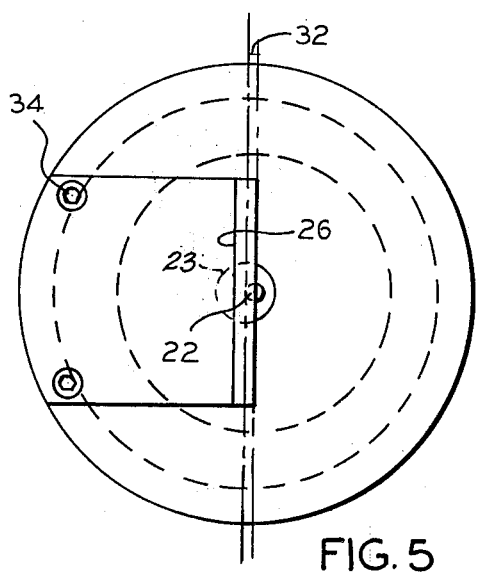
FIG. 5 is a bottom view of the router for trimming laminate plastics after rotation of the template unit, showing the housing undersurface and midline evacuated core in phantom.

FIG. 3 shows a cross sectional view of the router in operation with the blade 22 extending below the rotatable base 20. The base 20 with attached template follower 24 comprise the rotatable template unit 19. The template follower 24 is attached to the template base 20 by screws 34 as shown in FIG. 5. Between the template base 20 and the template follower 24 is a clearance space 36 for inserting laminate plastic material for trimming. A lip 26 on the template follower 24 abuts the edge of a template material as a guide for the trimming. The template base unit 19 is held securely to the undersurface 27 of housing 14 by means of bolts 28 provided in several locations. Rotation of the housing unit 14 is accomplished by loosening these bolts 28, if necessary, and rotating housing 14 with respect to template unit 19, and re-tightening bolts 28, if necessary, when blade 22 is in a desired position. The bolts 28 slide above the housing undersurface 27, providing security as well as an additional contact surface.

Figure 4:
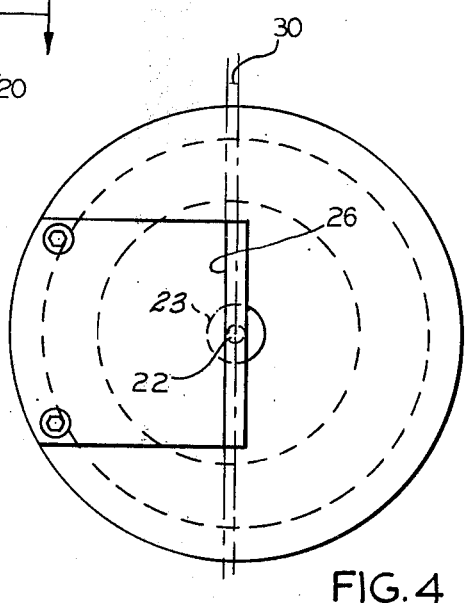
FIG. 4 is a bottom view of the router for trimming laminate plastics before rotation of the template unit, showing the housing undersurface and midline evacuated core in phantom.

FIGS. 4 and 5 demonstrate the distance the blade 22 is moved, by rotation of housing 14 relative to lip 26. In FIG. 4 the distance 30 represents the radial distance of the blade 22 when the router for trimming laminate plastics is not in use. In FIG. 5 the template base 20 has been rotated and the router 8 is now in position for use. The radial distance 32 (FIG. 5) is equal to radial distance 30, but the location of blade 22 relative to lip 26 has changed. The blade 22 is now in position for trimming along a line positioned by the lip 26.

The template base 20 extends beyond the circumference of the housing undersurface 27 and housing 14 is rotatable with respect to the template base 20 about a second axis 40 parallel to the first axis 25 of the blade 22. The rotation of the housing 14 causes an adjustment of the blade 22 relative to the guide 26.

In operation, the router for trimming laminate plastics 10 is held by the handles 18 and 18' and moved along a first surface adjacent the lip. A laminate plastic is inserted into the clearance space 36 past the blade 22, in order to trim the laminate plastic. Once the laminate plastic is trimmed, the laminate plastic is flush with the first surface.

Before the router for trimming laminate plastics can be operated, the housing 14 can be rotated. Housing 14 is capable of being rotated about 360° with respect to base unit 19. Needless to say, it is not rotated the whole 360° every time. The rotation moves the blade 22 into position for trimming. The blade 22 is moved by way of example the distance from one side at 30 to the other side at 32, so that the original periphery distance of the blade is equal to the midpoint of the blade. Similarly rotation of the housing 14, the blade 22 and the lip 26 of the template follower 24 are in the same plane. In such a configuration the plane is a straight line, so that the blade 22 is directly over the lip 26. Once so adjusted, no further adjustments are necessary until the end of the trimming.

From the above description it will become apparent that the arrangement is very simple in construction and easy to operate. Also, there are a number of changes, adaptations, and modifications of the present invention which come within the province of those skilled in the art. However, it is intended that all such variations not departing from the spirit of the invention be considered as within the scope thereof as limited solely by the appended claims.

I claim:

1. A router for trimming plastic laminate material comprising:

a housing having a base;
   a power unit within said housing for rotatably driving a cutting blade about a first axis perpendicular to said base;
   said cutting blade extending beyond said base;
   means for adjusting the amount of said cutting blade extending beyond said base;
   a template follower attached to said base;
   said template follower having a guide means for following the contour of a surface of a template material;
   said guide means including a template abutment engaging a perpendicular surface of said template material;
   said template abutment disposed in a vertical plane;
   means for adjusting in a substantially horizontal direction said template follower and for aligning said blade comprising said base rotatably attached to said housing about a second axis perpendicular to said base;
   rotation of said housing adjusting the position of said blade relative to said guide means; and
   a clearance space between said base and said template follower for insertion of a material to be trimmed by said blade.

2. The router of claim 1 wherein said cutting blade extends through an aperture in said base;
   the tip of said cutting blade extending into said clearance space, whereby said material to be trimmed is disposed in said clearance space between said base and said template follower and in contact with said blade tip.

3. The router of claim 1 wherein said template follower is disposed adjacent said template material, and said guide means contacts and follows a surface of said template.

* * * * *